March 17, 1953     R. J. BABBITT     2,631,331
MEAT PATTY MAKER
Filed Aug. 25, 1950
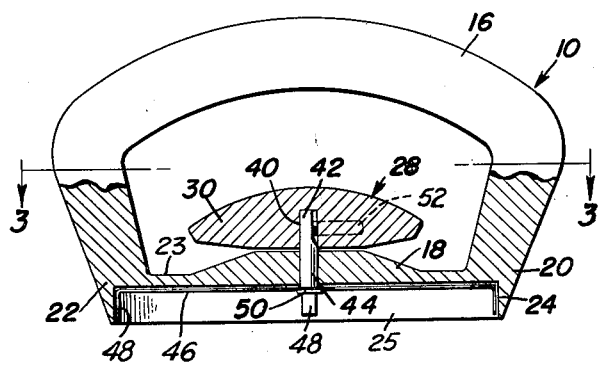
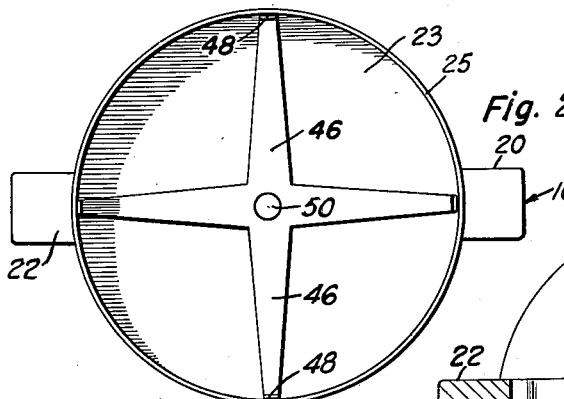
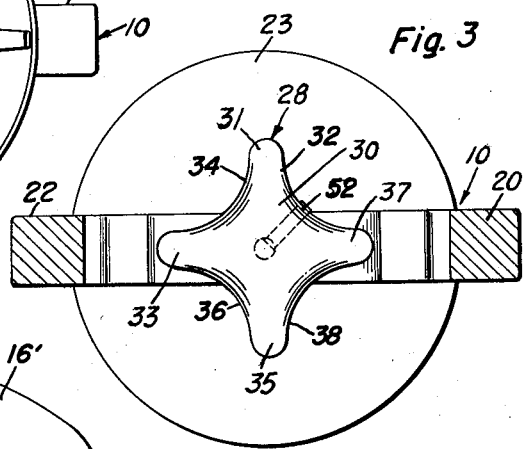
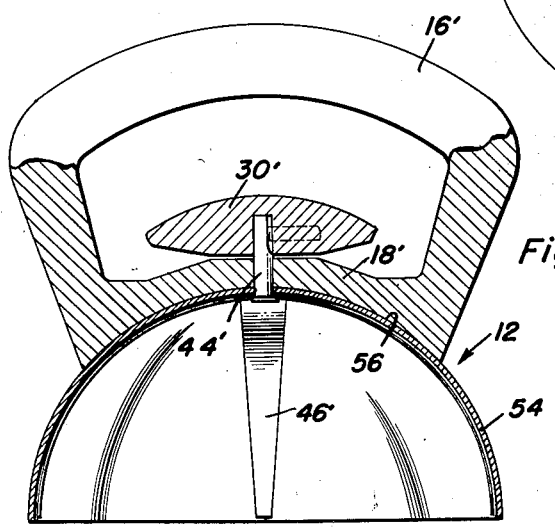
Raymond J. Babbitt
INVENTOR.

Patented Mar. 17, 1953

2,631,331

UNITED STATES PATENT OFFICE 2,631,331

MEAT PATTY MAKER

Raymond J. Babbitt, Cleveland, Ohio

Application August 25, 1950, Serial No. 181,443

2 Claims. (Cl. 17—32)

This invention relates to culinary implements, very generally speaking, but has reference, more particularly, to a meat patty molding and dislodging device, one which is highly adapted for practical use in one's home kitchen for readily cutting portions from a batch of hamburger steak into cakes and then scraping and releasing said cake from the form or mold, whereby to be dropped with requisite nicety into a frying pan.

Briefly summarized, the preferred form of the invention has to do with a patty shaping mold and a loop-shaped handle, the bight portion of the latter arching centrally over one side of the top of the mold and the end portions being integrated with diametrically opposite marginal portions of said mold. A bladed cutter or scraper is mounted for rotation in the receptacle portion of the mold and has a vertical turning pin or axle journaled for rotation in an axial central portion of said mold directly beneath the hand-grip of said handle. A knob is secured to the pin, situated atop the mold and spaced downwardly beneath the stated bight portion of said handle and, using one hand, and gripping said hand-grip and rotating the knob with the fingers of the same hand, the mold is held stationary and the knob and scraper are turned with the result that the compressed meat cake is scraped loose and allowed to drop freely from the mold into the frying pan.

One object of the invention has to do, as is apparently obvious from the preceding general description, with an integrated mold and complemental loop handle wherein the lateral end portions of the handle are joined with diametrically opposite portions of the mold and wherein a multiple bladed rotary cutter or scraper adequately scrapes the complete cake loose from the mold by way of a rotary knob which is situated on the mold directly beneath the hand gripping portion of the handle, said knob being characterized by at least four circumferentially spaced finger actuable trip members and said cutter also having at least four circumferentially spaced blades, whereby a nominal quarter turn of the knob is ample to render the entire scraper effective throughout a complete circle.

More explicitly, novelty is predicated on a mold having the stated handle means, scraper, and operating and turning knob for the scraper, said knob cooperating with the central portion of the top of said mold and being situated directly beneath the hand grip for one-handed operation of the knob, said knob being unique in that it embodies equidistant circumferentially spaced notches or seats and outstanding projections constituting the aforementioned finger actuable trip elements.

Then, too, novelty is predicated on a construction having the aforementioned special structural adaptations wherein the bladed scraper and pin constitute one element, these being rotatably assembled and held in place by the knob and said knob being readily applicable and removable, whereby the device may be conveniently dismantled for effective cleaning and drying.

Further objects of the present invention are to provide such means that are simple in construction, economical to manufacture, easily operated and of general superiority.

Various other objects and advantages will become apparent from the detailed description to follow. The best forms in which I have contemplated applying my invention are clearly illustrated in the accompanying drawings, wherein:

Figure 1 is a side view, partly in section and partly in elevation, of one form of the present invention showing a form mounted thereon which is particularly adapted for shaping circular patties;

Figure 2 is a bottom plan view of Figure 1;

Figure 3 is a horizontal transverse sectional view taken substantially along the plane of line 3—3 of Figure 1; and Figure 4 is a side elevational view, with parts in section, of a modified form of culinary implement which is adapted for holding meat patties and the like to semi-spherical form.

Referring more particularly to the drawings, wherein like numerals designate like parts throughout, the numeral 10 designates generally the first form of the invention and the numeral 12 designates generally the second form thereof.

The stated implement or meat patty maker 10 is characterized in Figures 1 to 3, inclusive, by a unit which is made from moldable materials, the same comprising a body portion 18 fashioned into a mold 24, the latter having a circular top 23 provided with an endless marginal flange 25 extending from one side of said top 23. The complemental handle means is preferably a loop-shaped handle and this extends from the other side of said top and embodies a bight portion which centrally spans the top of the mold in vertically spaced relation and has lateral end or arm portions 20 and 22 which are integrated with the outer marginal portion of the mold at diametrically opposite points, said bight portion providing a hand-grip.

The release means, designated generally at 28 is characterized by a knob 30 which is provided with a plurality of equidistant circumferentially spaced notches 32, 34, 36 and 38 providing finger engaging seats and also defining outstanding finger engaging projections or trip elements 31, 33, 35 and 37, respectively. Said knob 30 is recessed at 40 for receiving the non-circular end 42 of a vertical pin 44 which is rotatably received in a bearing hole provided therefor in said mold 18. The lower end of the pin 44 has fixedly secured thereto a plurality of thin scraping blades 46 which are provided with angulated ends 48. The main portions of the blades 46 are adapted to scrape the coacting top surface of the mold while the angulated ends 48 are adapted to scrape the flange or vertical wall 25 thereof for releasing the food product which is lodged therein. The pin 44 is provided with an annular flange 50 whereby the blades 46 may be retained thereby. The bladed scraper is secured to the pin for rotation therewith. It should be here noted that if four blades are provided, as shown in Figure 2, the knob 30 should be provided with four notches as is shown in Figure 3. In this manner, the amount of rotation of the handle to effect sufficient rotation of the blades for complete release of the food product within the mold may readily be determined. Thus, when four blades are provided, the knob 30 need merely be rotated a quarter turn, which is best indicated by a four notched knob.

A set screw means 52 is provided within the knob 30 whereby the latter is held on the non-circular portion 42 of the pin 44.

Referring now more particularly to Figure 4, it will be seen that a modified form of the invention is presented. The molding form 54 is substantially semi-spherical in shape and is adapted to be received in a complementary recess 56 which is cut into the body portion 18' integrally formed with the handle means 16'. The release means include thin blades 46' which are substantially similar to the blades 46 shown in Figure 2. However, the blades 46' must be arcuated to conform to the inner surface of the member 54 whereby scraping thereof may be accomplished. The means for rotatably supporting the blades 46' includes the pin 44' and the means for rotating the pin 44' including the knob 30' which latter is the same as the already described knob 28.

With this form of the invention, meat patties and the like may be formed to semi-spherical shape if desired, and the meat may be generally released from the member 54 by rotation of the blades 46' in the same manner set forth hereinabove with regard to the blades 46.

It will be obvious that in both forms of the invention, a mold is provided wherein said mold is, in turn, provided with a loop-shaped handle with its central or bight portion arching in spaced relation over the central top portion of the mold whereby the mold and handle constitute a single assemblage. The scraper with its axle forming pin operating in the center bearing hole is a readily insertable and removable unit. By preference, four blades are provided and therefore, the scraper may be said to be cruciform in shape. In both forms of the invention, the knob is separably keyed on the upper end of the pin and rests in rotatable contact with the mold. Both knobs are the same in that they have circumferentially spaced finger notches and intervening finger trip elements. It follows, therefore, that turning the knob approximately one-quarter of a turn serves, because of the conforming cruciform shape of the knob, to impart rotation to the bladed scraper which is sufficient to cause the four blades to travel 90 degrees each, with the result that a simple quarter-movement of the knob actually effects a 360 degree cutting operation of the scraper.

It will readily be seen from the foregoing description taken in conjunction with the drawings that structures have been provided which will accomplish all of the objects hereinabove set forth. Of course, various other forms may be employed for making pieces of different shapes.

Having described the invention, what is claimed as new is:

1. A culinary implement comprising a rigid mold embodying a circular top having an endless lateral marginal flange extending from one side and a one-piece rigid loop-shaped handle extending from the other side and having end portions connected with diametrically opposite portions of said top, the intermediate portion of said handle bridging over said other side in spaced relation thereto and providing a hand-grip, said top being provided centrally with a bearing hole located directly beneath the central portion of said hand-grip, product contacting, dislodging and releasing means in the form of a bladed cutter having at least four radial blades, the latter being mounted for rotation within the confines of said mold with the blades contoured to conform to and being in scraping contact with cooperating surfaces of the top and flange of said mold, said cutter being provided centrally with an integral pin fitting removably and rotatably in and extending upwardly through the bearing hole and above the top of the mold, and a one-piece finger actuated knob having at least four radially extending marginally positioned trip elements, the latter being circumferentially spaced from each other, said knob being removably keyed on the upper end of said pin and situated for free rotation in the space between said top and hand-grip, the top of said knob being directly beneath and spaced downwardly from the underside of said hand-grip, said knob being of a diameter greater than the cross-section of said hand-grip and of a diameter appreciably less than the diameter of said mold, the distance between said knob and said hand-grip being predetermined and such that the thumb and middle finger of the hand holding said hand-grip may be optionally engaged with an available trip element, said bladed cutter, pin and knob being simultaneously and progressively turnable either clockwise or counter-clockwise throughout a circle of 360°, said knob and bladed cutter and pin being separable from said mold for cleaning the mold and said cutter, pin and knob, and said knob constituting means for clampingly and rotatably maintaining the parts in assembled relationship.

2. A culinary implement comprising a rigid mold embodying a circular top having an endless lateral marginal flange extending from one side and a one-piece rigid loop-shaped handle extending from the other side and having end portions connected with diametrically opposite portions of said top, the intermediate portion of said handle bridging over said other side in spaced relation thereto and providing a hand-grip portion, said top being provided centrally with a bearing hole located directly beneath the central portion of said hand-grip, product contacting, dislodging and releasing means embodying a bladed cutter, said cutter having four blades arranged at equidistant circumferentially spaced points, said blades being in cooperating contact with the coacting surfaces of the top and flange, said bladed cutter being provided centrally with an integral pin fitting removably and rotatably in and extending upwardly through the bearing hole and above the top of the mold, and a one-piece finger-actuated knob removably keyed on the upper end of said pin and situated for free rotation in the space between said top and handgrip, said knob being directly beneath and spaced downwardly from the underside of said hand-grip, and said knob being likewise cruciform and also having four finger actuatable trip elements projecting radially from the periphery of the knob and being operable in a step-by-step manner to advance the knob one-quarter turn as each trip element is actuated, said trip elements projecting to positions beyond said hand-grip so that when one trip element is engaged and advanced one step the next succeeding trip element is brought into an accessible position for the next operation of said knob and cutter, whereby the user may conveniently catch hold of the hand-grip and, while holding the latter, may reach down with a single finger or the thumb and engage the tip thereof slidingly with a conveniently situated one of said trip elements and so that by imparting an approximate quarter-turn to said knob, said bladed cutter becomes effective throughout a range of a 360° cycle of operation.

RAYMOND J. BABBITT.

REFERENCES CITED

The following references are of record in the file of this patent:

UNITED STATES PATENTS

| Number | Name | Date |
|---|---|---|
| 209,751 | Clewell | Nov. 12, 1878 |
| 803,906 | Keiner et al. | Nov. 7, 1905 |
| 1,069,509 | Winn | Aug. 5, 1913 |
| 1,690,526 | Bilodeau | Nov. 6, 1928 |
| 1,700,765 | Kaster | Feb. 5, 1929 |
| 2,137,811 | Royal | Nov. 22, 1938 |